(12) United States Patent
Balasaygun et al.

(10) Patent No.: US 11,637,925 B2
(45) Date of Patent: Apr. 25, 2023

(54) SYSTEMS AND METHODS OF AN INTELLIGENT WHISPER

(71) Applicant: Avaya Management L.P., Durham, NC (US)

(72) Inventors: Mehmet Balasaygun, Freehold, NJ (US); Valentine C. Matula, Granville, OH (US)

(73) Assignee: Avaya Management L.P., Durham, NC (US)

( * ) Notice: Subject to any disclaimer, the term of this patent is extended or adjusted under 35 U.S.C. 154(b) by 0 days.

(21) Appl. No.: 17/105,094

(22) Filed: Nov. 25, 2020

(65) Prior Publication Data

US 2022/0166877 A1     May 26, 2022

(51) Int. Cl.
*H04M 3/42*     (2006.01)
*H04M 3/51*     (2006.01)

(52) U.S. Cl.
CPC ..... *H04M 3/42365* (2013.01); *H04M 3/5158* (2013.01)

(58) Field of Classification Search
CPC . H04M 3/42365; H04M 3/5158; G10L 25/24; G10L 15/22; G10L 25/18; G10L 13/033; G10L 17/26; G10L 13/08; G10L 2015/223
See application file for complete search history.

(56) References Cited

U.S. PATENT DOCUMENTS

| | | | |
|---|---|---|---|
| 9,674,357 B1 * | 6/2017 | Pycko | G10L 15/08 |
| 10,192,552 B2 | 1/2019 | Raitio et al. | |
| 2007/0121865 A1 | 5/2007 | Jachner | |
| 2012/0017149 A1 * | 1/2012 | Lai | H04L 65/1069 715/716 |
| 2013/0014266 A1 | 1/2013 | Yeung | |
| 2017/0199998 A1 * | 7/2017 | Bruno | H04L 63/107 |
| 2019/0122666 A1 * | 4/2019 | Raitio | G10L 25/24 |
| 2019/0132895 A1 * | 5/2019 | Lee | G10L 15/08 |
| 2020/0082123 A1 * | 3/2020 | Baracaldo Angel | G06F 21/6245 |
| 2020/0364724 A1 * | 11/2020 | Pulugurtha | G06Q 30/016 |
| 2021/0027802 A1 * | 1/2021 | Bhalla | G06F 3/165 |

\* cited by examiner

*Primary Examiner* — Phung-Hoang J Nguyen

(74) *Attorney, Agent, or Firm* — Sheridan Ross P.C.

(57) ABSTRACT

The present disclosure provides, among other things, methods of managing a whisper, the methods including: establishing a communication session; receiving a whisper request to provide the whisper to a first device associated with the communication session; retrieving environmental information; comparing the environment information to a rule; configuring the whisper based on the comparison; and providing the whisper based on the comparison.

20 Claims, 5 Drawing Sheets

SYSTEMS AND METHODS OF AN INTELLIGENT WHISPER

FIELD

Embodiments of the present disclosure relate generally to communication applications and specifically to improving whisper functions in a communication application.

BACKGROUND

Multi-party communications are becoming more prevalent. One example of such communications occurs in contact centers. The contact center is a hub of communications between business and customers, connecting over multiple channels to facilitate sales and support to deliver the best possible customer service.

In the modern contact center, a whisper function is a one way audio stream that is used to provide additional information to a contact center agent by providing an audio stream that is heard only by a contact center agent and not by a callee. For example, when an agent is in a communication session with a callee and when a whisper function is enabled between a supervisor in a contact center and an agent of the contact center, the agent is able to hear both the supervisor and the callee at the same time; however, the supervisor's voice (e.g., a "whisper") is heard only by the agent and not the callee. In this situation, the whisper function allows an agent to simultaneously listen to both the supervisor and the callee without the callee being aware that the supervisor is participating in the communication session. The whisper feature is often used to provide help or training to the agent, as well as to provide the agent with additional information that is relevant to the communication session.

BRIEF SUMMARY

Whisper functions in use at a conventional contact center leave much to be desired. For example, whisper functions are not intelligent, meaning that they do not account for environmental variables and user preferences. For example, conventional whisper functions are not configurable based on location and/or other environmental conditions that may make the whisper inappropriately timed or played. Sometimes whispers may be audible to other people who are around the person receiving the whisper when the other people are not meant to hear the whisper. This can be annoying, or worse, it may also compromise sensitive information. Sometimes, when a whisper is sent, a receiving user is not able to listen to the whisper at that time; however, conventional whisper functions don't allow for adjusting the timing of the whisper. Thus, it would be advantageous to users if whisper functions could be configured based on environmental information and/or rules. Users of a whisper function would benefit from an ability to create and manage rules that adjust how a whisper is sent and/or received.

Users of a whisper function would also benefit from an ability to set and manage properties of a whisper based on information related to the communication session, including information about the surrounding environment on the receiving end of the whisper. In addition, users often have multiple devices available to them for use in communication sessions and the devices may be in close proximity. Being able to configure which device receives a whisper would be helpful to users. Further, being able to adjust the timing of whispers would be helpful to users. Such additional functions to manage the whisper advantageously enable a more functional and improved whisper experience. Thus, there is a need for systems and methods to improve the whisper function.

A whisper function is conventionally a one-way audio stream; however, it can be more than just a one way audio stream. In embodiments disclosed herein, a whisper function may be integrated with visual options in addition to the audio stream. The visual options can include notifications that the whisper is being sent, indications of properties of the whisper (such as a privacy or importance of the whisper), options for managing the whisper, and options related to transcription of the whisper. In addition to visual options, audio options also can be provided. These can include audio notifications that the whisper is being sent, and options for adjusting the audio delivery of the whisper. Visual and audio options may be managed by rules.

Rules may determine the configuration and management of whisper functions as disclosed herein. For example, environmental information may be determined (e.g., via sensors associated with devices receiving whispers) and compared with rules to determine actions to take to configure and manage the whisper functions. User preferences can be taken into account with the rules.

Further, in embodiments disclosed herein, a whisper function can be used in environments other than a call center. For example, a whisper can be used in a conference call, in a messaging technology, and in other voice, text, and video communications.

In some aspects, whisper functions can be integrated with presence information and/or location information. For example, presence and/or location information can be used to determine a device to which to deliver a whisper, such as a device that a user is active on (e.g., as determined by the user's presence information and/or location information). The presence and location information can be used in combination with any other information, as disclosed herein, to configure and manage whispers.

In various embodiments, a user's current communications activity may be used in combination with environmental information to configure and manage a whisper. Information about a user's current communications activity, such as whether the user is engaged with a headset or an open speaker, may be used to customize the configuration and delivery of a whisper.

Any other information about the receiving user's surroundings may be used in embodiments herein to configure and manage a whisper. For example, environmental information including a determination of whether the user is alone (e.g., detection of the presence of additional people other than the user) may be used to configure and manage the whisper. Also, if a contact center agent is in an environment that is not conducive to receiving a whisper, the contact center agent would be able to manage the whisper using the methods and systems disclosed herein. Embodiments disclosed herein can be advantageous for contact center agents who work outside of the contact center and may be subject to differences in surrounding environments.

Embodiments disclosed herein can advantageously provide improvements to whisper features. For example, advantageous features include the ability to use messages, callbacks, and transcriptions with a whisper, and the ability to integrate privacy features and an awareness of surroundings in the whisper functions.

According to some aspects of the present disclosure, methods of managing a whisper include: establishing a communication session; receiving a whisper request to provide the whisper to a first device associated with the communication session; retrieving environmental information; comparing the environment information to a rule; configuring the whisper based on the comparison; and providing the whisper based on the comparison.

In some embodiments, the rule is a privacy requirement for an environmental surrounding at the first device at a time of delivery of the whisper.

In some embodiments, the first device is participating in the communication session.

In some embodiments, the privacy requirement defines a privacy level of the environmental surrounding, the retrieving the environmental information determines a privacy level of the environmental surrounding, and the comparing includes comparing the privacy requirement with the privacy level.

Another aspect of the present disclosure is that the method further includes: detecting a privacy level of the user in the environmental information, where the configuring the whisper is based on the privacy level.

In some embodiments, a modality of the whisper changes based on the comparing.

In some embodiments, the environmental information is obtained from a sensor associated with the first device.

In some embodiments, a user of the first device consented to the obtaining the environmental information from the sensor.

In some embodiments, the first device is associated with a user, the configuring the whisper includes determining that the whisper should be provided to a second device that is associated with the user, and the providing the whisper includes providing the whisper to the second device.

Another aspect of the present disclosure is that the method further includes: comparing the environment information to a threshold, where the rule includes the threshold.

According to some aspects of the present disclosure, systems of managing a whisper include: a processor; and a computer-readable storage medium storing computer-readable instructions which, when executed by the processor, cause the processor to: establish a communication session; receive a whisper request to provide the whisper to a first device associated with the communication session; retrieve environmental information; compare the environment information to a rule; configure the whisper based on the comparison; and provide the whisper based on the comparison.

In some embodiments, the rule is a privacy requirement for an environmental surrounding at the first device at a time of delivery of the whisper.

In some embodiments, the first device is participating in the communication session, the privacy requirement defines a privacy level of the environmental surrounding, the retrieving the environmental information determines a privacy level of the environmental surrounding, and the comparing includes comparing the privacy requirement with the privacy level.

Another aspect of the present disclosure is that the system further includes: detecting a privacy level of the user in the environmental information, where the configuring the whisper is based on the privacy level.

In some embodiments, a modality of the whisper changes based on the comparing.

In some embodiments, the environmental information is obtained from a sensor associated with the first device.

In some embodiments, a user of the first device consented to the obtaining the environmental information from the sensor.

In some embodiments, the first device is associated with a user, the configuring the whisper includes determining that the whisper should be provided to a second device that is associated with the user, and the providing the whisper includes providing the whisper to the second device.

Another aspect of the present disclosure is that the system further includes: comparing the environment information to a threshold, where the rule includes the threshold.

According to some aspects of the present disclosure, computer program products for managing a whisper include a non-transitory computer-readable storage medium having computer-readable program code embodied therewith, the computer-readable program code configured, when executed by a processor, to: establish a communication session; receive a whisper request to provide the whisper to a device associated with the communication session; retrieve environmental information; compare the environment information to a rule; configure the whisper based on the comparison; and provide the whisper based on the comparison.

As used herein, a communication may also be referred to as an "engagement," a "message," and a "communication session" and may include one or multiple electronic records, text, rich media, or data structures that are transmitted from one communication device to another communication device via a communication network. A communication may be transmitted via one or more data packets and the formatting of such data packets may depend upon the messaging protocol used for transmitting the electronic records over the communication network. A communication includes a whisper and a whisper function.

As used herein, the term "action" refers to various types of actions, including but not limited to processing information using processing input to obtain processing decisions as described herein, configuring/forwarding/sending one or more communications, displaying information, determining additional related information and actions to perform, monitoring for matching information, including key words and/or repeated content, monitoring activity of one or more users and/or groups, determining topics and related information (e.g., pieces of content), and interacting with databases. Unless described otherwise herein, actions of portions thereof may be executed automatically; e.g., without human involvement.

As used herein, the term "manage" refers to actions taken to control or direct elements. The term manage includes, and is not limited to, creating, implementing, performing, comparing, configuring, updating, revising, editing, changing, processing, deleting, saving, displaying, transmitting, transcribing, and otherwise implementing changes and controlling elements.

As used herein, Artificial Intelligence (AI) can refer to an artificial neural network that has been trained to perform certain actions. The training may make use of a data set that describes initial data used to train the system. AI can be referred to as machine learning.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Illustrative hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARIVI926EJS™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Methods described or claimed herein can be performed with traditional executable instruction sets that are finite and operate on a fixed set of inputs to provide one or more defined outputs. Alternatively or additionally, methods described or claimed herein can be performed using AI, machine learning, neural networks, or the like. In other words, a system or contact center is contemplated to include finite instruction sets and/or artificial intelligence-based models/neural networks to perform some or all of the steps described herein.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides illustrative embodiments only, and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the illustrative embodiments will provide those skilled in the art with an enabling description for implementing an illustrative embodiment. It should however be appreciated that the present disclosure may be practiced in a variety of ways beyond the specific detail set forth herein.

While the illustrative aspects, embodiments, and/or configurations illustrated herein show the various components of the system collocated, certain components of the system can be located remotely, at distant portions of a distributed network, such as a Local Area Network (LAN) and/or the Internet, or within a dedicated system. Thus, it should be appreciated, that the components of the system can be combined in to one or more devices or collocated on a particular node of a distributed network, such as an analog and/or digital telecommunications network, a packet-switched network, or a circuit-switched network. It will be appreciated from the following description, and for reasons of computational efficiency, that the components of the system can be arranged at any location within a distributed network of components without affecting the operation of the system.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

Figure 1:
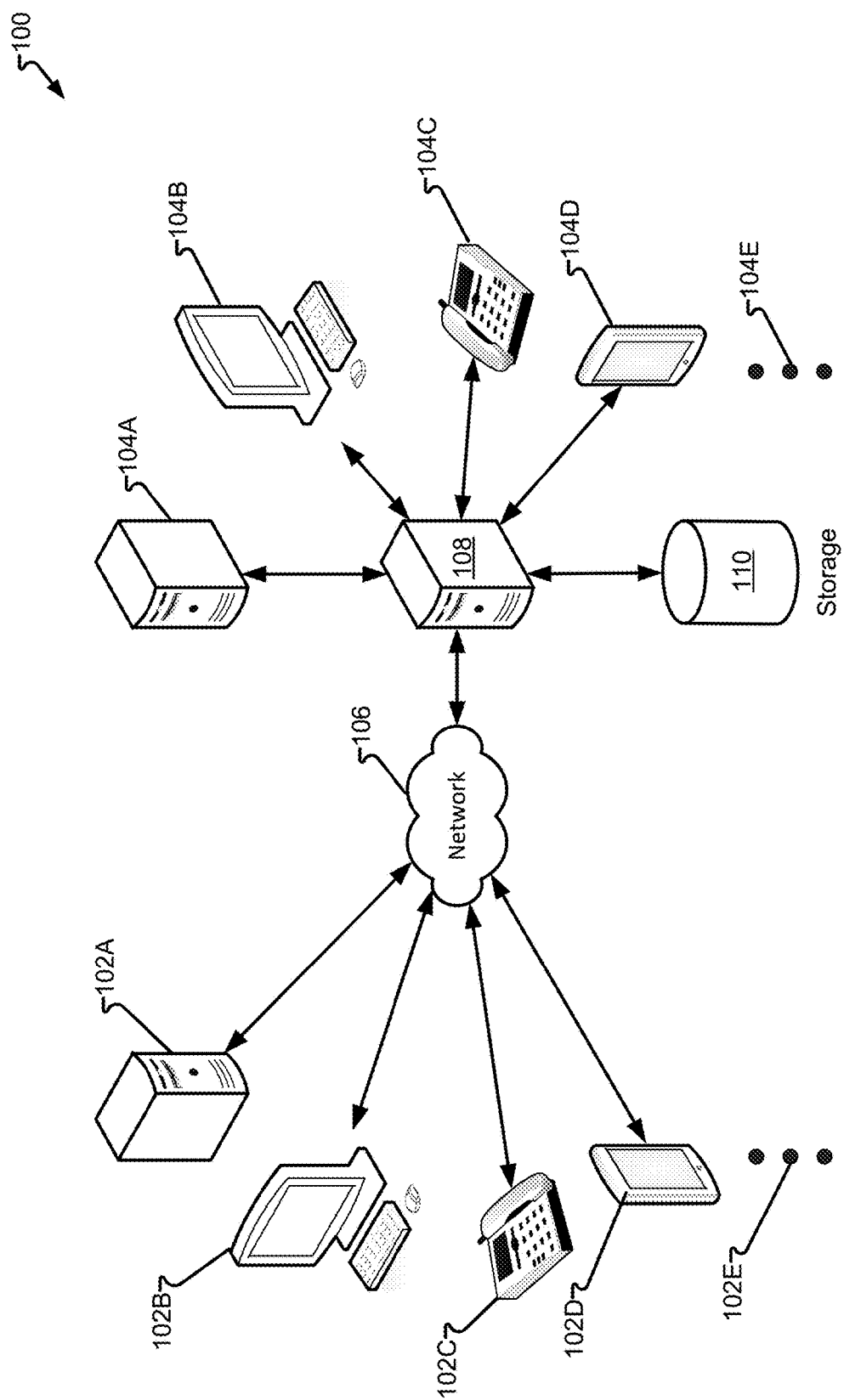
FIG. 1 is a block diagram of a first illustrative system for implementing a communication session in accordance with some embodiments of the present disclosure.

FIG. 1 depicts system 100 in accordance with embodiments of the present disclosure. In one embodiment, first user communication device comprises one or more devices and/or device types, such as first user communication device 102A being a server, computer, or other communication component; first user communication device 102B comprising a computer, laptop, or other application-executing device, such as to execute a softphone, messaging system, video/voice-over-IP, etc. First user communication device 102A and first user communication device 102B may operate independently or cooperatively. First user communication device 102C may be embodied as a telephone (e.g., plain old telephone system (POTS) device, and/or a voice-over-IP (VoIP) device); First user communication device 102D may be a handheld device, such as a personal data assistant, cellular telephone/smart-phone, tablet, etc., which may communicate via cellular communications and/or other wired or wireless networking communications (e.g., WiFi, WiMax, Bluetooth, etc.); and other first user communication device 102E which may comprise other current or future communication devices for use by a user (not shown in FIG. 1) to communicate with one or more second user communication device.

In another embodiment, second user communication device comprises one or more devices and/or device types, such as second user communication device 104A which may comprise a server, computer, or other communication component; second user communication device 104B, which may comprise a communication terminal with software and/or communications to other components (e.g., processors, storage/memory devices, etc.); second user communication device 104C which may be embodied a telephone (e.g., POTS, VoIP, etc.); second user communication device 104D may be a handheld device, such as a personal data assistant, cellular telephone/smart-phone, tablet, etc., which may communicate via cellular communications and/or other wired or wireless networking communications (e.g., WiFi, WiMax, Bluetooth, etc.); and other second user communication device 104E which may comprise other current or future communication devices for use by a user (not shown in FIG. 1) to communicate with one or more first user communication device.

System 100 omits common components typically utilized to facilitate communication between one or more first user communication device 102 and one or more second user communication device 104. The network 106 can be any type of network familiar to those skilled in the art that can support data communications using any of a variety of commercially-available protocols, including without limitation SIP, TCP/IP, SNA, IPX, AppleTalk, and the like. Merely by way of example, the communication network 104 may correspond to a LAN, such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.9 suite of protocols, the IEEE 802.11 suite of protocols, the Bluetooth® protocol known in the art, and/or any other wireless protocol); and/or any combination of these and/or other networks. Network 106 may be or support communications comprising one or more types (e.g., video, analog voice, digital voice, text, etc.) and/or media (e.g., telephony, Internet, etc.). Network 106 may comprise portions of other networks (e.g., ethernet, WiFi, etc.) and/or virtual networks (e.g., VPN, etc.).

Figure 2:
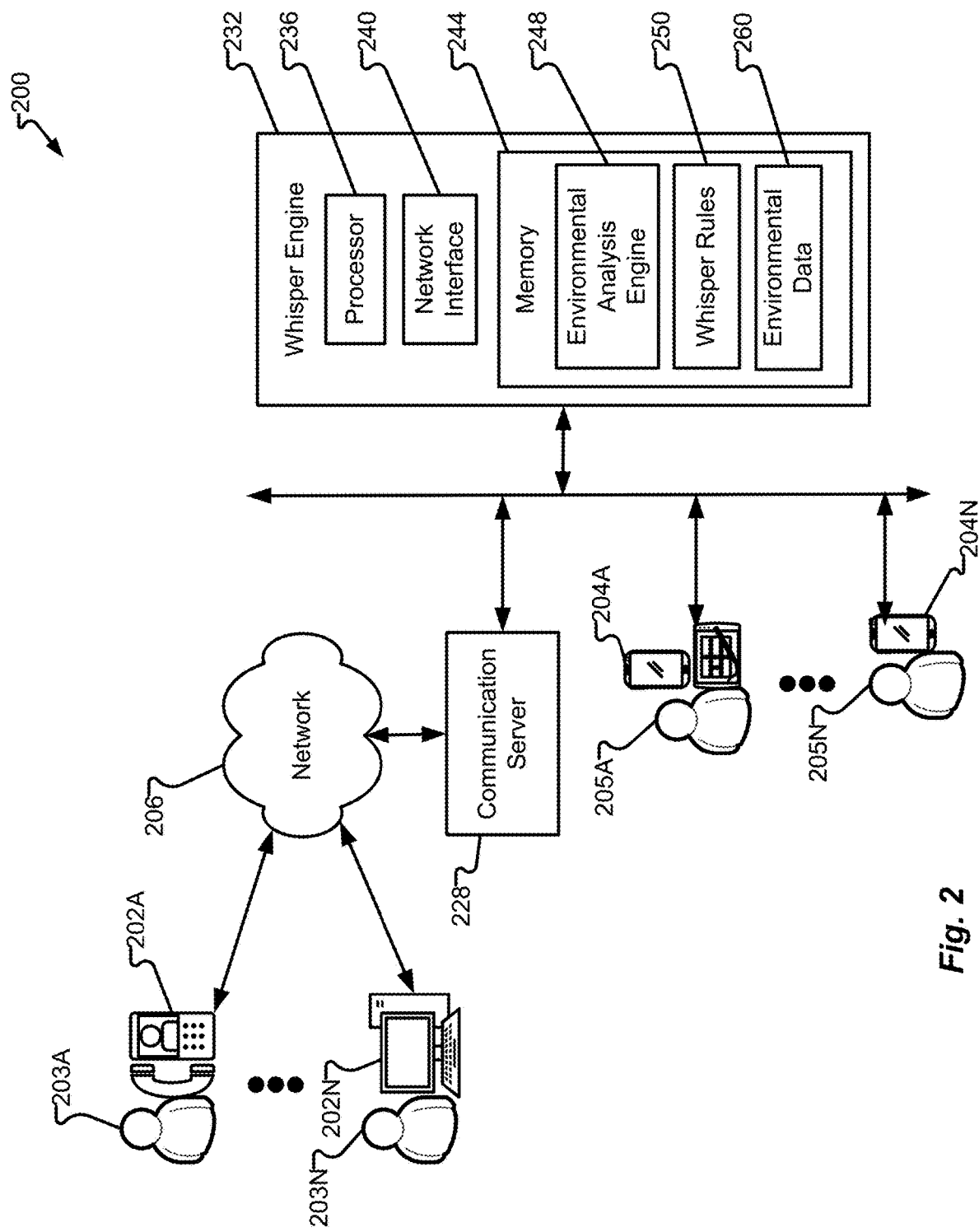
FIG. 2 is a block diagram of a second illustrative system for implementing a communication session in accordance with some embodiments of the present disclosure.

Turning to FIG. 2, a a block diagram showing a second illustrative system 200 in accordance with some embodiments described herein is shown. In some aspects, the components shown in FIG. 2 may correspond to like components shown in FIG. 1. The communication system 200 is shown to include a communication network 206 that interconnects users 203A-203N via communication devices 202A-202N with users 205A-205N via communication devices 204A-204N. Users include, and may be referred to herein as people, humans, human agents, administrators, supervisors, participants, customers, attendees, and entities (such as businesses, organizations, business owners, and employees). The network 206 may connect to communication devices in any manner, including via communication server 228. Thus, any of users 203A-203N and/or 205A-205N may communicate with any of users 203A-203N and/or 205A-205N through their respective devices and communication server 228 in addition to network 206. Communication server 228 may also communicate with whisper engine 232 via a communication channel.

Communication devices as disclosed herein (e.g., 202A-202N and/or 204A-204N) may correspond to a computing device, a personal communication device, a portable communication device, a laptop, a smartphone, a personal computer, and/or any other device capable of running an operating system, a web browser, or the like. For instance, a communication device may be configured to operate various versions of Microsoft Corp.'s Windows® and/or Apple Corp.'s Macintosh® operating systems, any of a variety of commercially-available UNIX® such as LINUX or other UNIX-like operating systems, iOS, Android®, etc. These communication devices (e.g., 204A-204N and/or 202A-202N) may also have any of a variety of applications, including for example, a database client and/or server applications, web browser applications, chat applications, social media applications, calling applications, etc. A communication device (e.g., 204A-204N and/or 202A-202N) may alternatively or additionally be any other electronic device, such as a thin-client computer, Internet-enabled mobile telephone, and/or personal digital assistant, capable of communicating via communication network 206 and/or displaying and navigating web pages or other types of electronic documents.

A user (e.g., 203A-203N and/or 205A-205N) may use multiple different communication devices (e.g., multiple of 202A-202N and/or 204A-204N) to communicate via a single asynchronous communication channel. Alternatively, multiple users (e.g., multiple 203A-203N and/or 205A-205N) may use a single or multiple communication devices (e.g., 202A-202N and/or 204A-204N). As a non-limiting example, a user may login to a web-based portal or authenticate themselves with a particular chat channel and then utilize the web-based portal or chat channel to communicate with any one of multiple communication devices (e.g., 204A-204N and/or 202A-202N). Alternatively or additionally, a user may use one of their communication devices (e.g., 204A-204N and/or 202A-202N) to transmit one type of communication and use another communication device to send a communication of another type.

In some embodiments, one or more servers may be configured to perform particular actions specific to supporting functions of the whisper engine 232. For instance, the communication server 228 may correspond to one or more servers that are configured to receive communications and make decisions for the communications, as well as communicate with elements of the system. The communication server 228 may correspond to a single server or a set of servers that are configured to establish and maintain communication channels between users 203A-203N and 205A-205N and may contain processor(s) and memory to store and manage communications data inxlusinf qhiapwea. In some embodiments, the communication server 228 may work in cooperation with the whisper engine 232 to manage information, as described herein.

The methods and systems for managing whispers, as described herein, may be carried out on one or more servers and/or one or more clients, and/or one or more intermediary components (including AI client side processors), or any combination thereof. For example, any one or more of the components described herein, or any combinations of components (e.g., the whisper engine 232 and/or any respective processing components associated therewith) can be associated with and/or executed on a social media server, a social media client, or any other intermediary component hosted separately. In the methods and systems disclosed herein, a whisper function can be used in environments other than a call center, including a conference call, in a messaging technology, and in other voice, text, and video communications, for example.

In some embodiments, the communication server 228 may be responsible for establishing and maintaining communications including digital text-based communication channels as well as voice channels between users 203A-203N and 205A-205N. The communication server 228 may be configured to maintain state information for one or more users 203A-203N and 205A-205N at any given point in time. The communication server 228 can establish and maintain communication data, including presence data, location data, and other data related to users and/or devices. As discussed herein, communication data includes and is not limited to any data involving a user and/or a device involved in communications, as well as communications of a user and/or device. Thus, as some non-limiting examples, the communication server 228 may be configured to process location data received from a user communication device (e.g., 204A-204N and/or 202A-202N) and utilize a messaging protocol and/or a communication protocol. The communication server 228 may also be configured to process presence data. In some embodiments, the communication server 228 may be configured to process social media communications received from a user communication device (e.g., 204A-204N and/or 202A-202N) and utilize a messaging protocol and/or a communication protocol.

Non-limiting examples of messaging protocols that may be supported by the communication server 228 include Internet Message Access Protocol (IMAP), Post Office Protocol (POP), Simple Mail Transfer Protocol (SMTP), and Exchange. The communication server 228 may alternatively or additionally be configured to support real-time or near-real-time text-based communication protocols, video-based communication protocols, and/or voice-based communication protocols. Various functionality of the communication server 228 may be performed by the whisper engine 232 and/or other servers and server components such as additional memory and processors (not shown).

It should be appreciated that the communication server 228 may be configured to support any number of communication protocols or applications whether synchronous or asynchronous. Non-limiting examples of communication protocols or applications that may be supported by the communication server 228 include the Session Initiation Protocol (SIP), File Transfer Protocol (FTP), Hypertext Transfer Protocol (HTTP), HTTP secure (HTTPS), Transmission Control Protocol (TCP), Java, Hypertext Markup Language (HTML), Short Message Service (SMS), Internet Relay Chat (IRC), Web Application Messaging Protocol (WAMP), SOAP, MIME, Real-Time Messaging Protocol (RTP), Web Real-Time Communications (WebRTC), WebGL, XMPP, Skype protocol, AIM, Microsoft Notification Protocol, VoIP, email, etc. Again, in addition to supporting text-based communications, the communication server 228 may also be configured to support non-text-based communications such as voice communications, video communications, and the like.

The whisper engine 232 and/or the communication server 228, or any components thereof, may also be configured to manage and analyze historical information in addition to real-time information. Historical information may include any information that is not real-time. In some embodiments, the communication server 228 may further interact with the whisper engine 232 to configure communications in accordance with the methods and systems disclosed herein and based on real-time or historical data. These capabilities of the communication server 228 may be provided by one or more modules stored in memory and executed by one or more processors of the communication server 228.

In addition, the communication server 228 may be responsible for obtaining user 203A-203N and/or 205A-205N information from various sources (e.g., communications, social media posts, presence statuses, state information, entity information, etc.) to support the methods and systems disclosed herein. In some embodiments, the communication server 228 may be configured to maintain a communications database that may be internal to, or external from, the communication server 228. The communications database (not shown in FIG. 2) may be used to store communications information in any number of data formats.

The whisper engine 232 may be configured to coordinate tasks between the environmental analysis engine 248 and the whisper rules 250. The whisper engine 232 and/or the environmental analysis engine 248 may have any configuration and may be made up of more or less components than what is shown in FIG. 2. For example, the whisper engine 232 may perform all of the tasks of the environmental analysis engine 248. Also, the environmental analysis engine 248 can perform tasks independently, without interacting with the whisper engine 232. In various embodiments, settings of the whisper engine 232, or any of its components, may be configured and changed by any users 203A-203N and 205A-205N of the system, and/or machine learning.

The whisper engine 232 may manage communications and information, including communications information and environmental information. Managing communications includes managing whispers. Managing information includes managing any information related to communications and environment, and includes managing rules. For example, managing communication information includes and is not limited to determining timing options of the communication (e.g., playback, callback, expiration, delay of a whisper, etc.), managing properties of a whisper (e.g., a level of privacy, level of importance, a level of sensitivity, whether to be a visual whisper and/or an audio whisper, setting and managing key words related to a whisper, etc.), managing delivery of a whisper (e.g., which devices to deliver to, a modality of delivery, status updates, notifications, warnings, etc.). Managing environmental information includes and is not limited to determining location and/or presence information, and determining environmental information related to the surroundings of a user and/or device (e.g., other users and/or devices in a specified vicinity, a type of environment of the surroundings, etc.). Managing communications includes managing the rules (e.g., by retrieving rules stored in whisper rules 250, analyzing information and making comparisons with the rules, updating rules, choosing applicable rules, comparing information to the rules, and implementing the rules by performing actions related to the whisper). The whisper engine 232 may manage information associated with the rules, such as by managing data associated with whisper engine 232 or components thereof. Communications may be monitored and managed based on information received by machine learning, and/or one from or more users 203A-203N and 205A-205N, from whisper rules 250, from memory 244, from whisper engine 232 or any of the other components thereof.

The whisper engine 232 is shown to include a processor 236 and a network interface 240 in addition to memory 244. The processor 236 may correspond to one or many computer processing devices. Non-limiting examples of a processor include a microprocessor, an Integrated Circuit (IC) chip, a General Processing Unit (GPU), a Central Processing Unit (CPU), or the like, as well as the other examples of the processors described herein. The network interface 240 may be configured to enable the whisper engine 232 to communicate with other machines in the system 200 and/or to communicate with other machines connected with the network 206. The network interface 240 may include, without limitation, a modem, a network card (wireless or wired), an infra-red communication device, etc.

The memory 244 may include one or multiple computer memory devices. The memory 244 may be configured to store program instructions that are executable by the processor 236 and that ultimately provide functionality of the whisper engine 232 described herein. The memory 244 may also be configured to store data or information that is usable or capable of being called by the instructions stored in memory 244. One example of data that may be stored in memory 244 for use by components thereof is whisper rules 250 and/or environmental data 260. The memory 244 may include, for example, Random Access Memory (RAM) devices, Read Only Memory (ROM) devices, flash memory devices, magnetic disk storage media, optical storage media, solid-state storage devices, core memory, buffer memory devices, combinations thereof, and the like. The memory 244, in some embodiments, corresponds to a computer-readable storage media and while the memory 244 is depicted as being internal to the whisper engine 232, it should be appreciated that the memory 244 may correspond to a memory device, database, or appliance that is external to the whisper engine 232.

Illustratively, the memory 244 is shown to store the environmental analysis engine 248, the whisper rules 250, and/or the environmental data 260 for execution by the processor 236. In some embodiments, each of the whisper engine 232 and/or the environmental analysis engine 248 may correspond to a set of processor-executable instructions (e.g., a finite instruction set with defined inputs, variables, and outputs). In some embodiments, the whisper engine 232 and/or the environmental analysis engine 248 may correspond to an AI component that is executed by the processor 236.

While certain components are depicted as being included in the whisper engine 232, it should be appreciated that such components may be provided in any other server or set of servers. For instance, components of the whisper engine 232 may be provided in a separate engine (not shown) and/or in the communication server 228, in an engine of the communication server 228, etc., and vice versa. Further still, embodiments of the present disclosure contemplate a single server that is provided with all capabilities of the communication server 228 and the whisper engine 232.

The environmental analysis engine 248 may be configured to detect, obtain, and/or analyze environmental information, which may be used by the whisper engine 232 in combination with communication information. For example, the environmental analysis engine 248 can obtain sensor information from devices 203A-203N and/or 204A-204N. The environmental analysis engine 248 may analyze content to classify the information (e.g., to identify one or more pieces of environmental information, to associate one or more pieces of environmental information with a device, user, and/or communication session, etc.). In various embodiments, the methods and systems disclosed herein may obtain a user consent to access data from an input device associated with the user. In various embodiments, the systems or methods may send a request to the user for approval to obtain a specified timeframe of camera input and/or microphone input when a whisper is requested to be sent to the user. The request may be a user preference configured in the system and maintained as a setting for all whispers, or the request may be sent to the user before, or concurrently with, each whisper needing environmental information. Consent for using input devices, and data therefrom, may be configured by the user and/or an administrator.

The environmental analysis engine 248 can detect and/or analyze information related to location of one or more communication devices (e.g., 204A-204N and/or 202A-202N) and/or users (e.g., 203A-203N and 205A-205N), presence information of one or more users (e.g., 203A-203N and 205A-205N), environmental information related to surroundings of one or more users (e.g., 203A-203N and 205A-205N) (including whether a user is alone or not), statuses of one or more communication devices (e.g., 204A-204N and/or 202A-202N), and can determine any other properties of a communication session. In some embodiments, the environmental analysis engine 248 may be configured to adhere to rules regarding how and when to detect and/or analyze the environmental information including rules for consent of a user to obtain sensor data from devices of the user. The rules may be managed using whisper rules 250 and/or whisper engine 232. For example, the rules may be configured by one or more users 203A-203N and/or 205A-205N and stored in whisper rules 250. The environmental analysis engine 248 may interact with the environmental data 260 to manage the information within environmental data 260.

The environmental analysis engine 248, in various embodiments, includes a machine learning model used to analyze the environmental information. As discussed herein, the information that the environmental analysis engine 248 (or any other component of the whisper engine 232) analyzes may be any visual and/or audible information, and can include historical information as well as information as it occurs in real-time. The environmental analysis engine 248 may provide appropriate signaling to a communication device (e.g., 204A-204N and/or 202A-202N) and/or the communication server 228 that enables the environmental analysis engine 248 to receive information from the communication device(s) and/or the communication server 228.

Environmental data 260 can include any information related to the surroundings and/or location of a user and/or device and includes environmental information. In various embodiments, environmental data 260 includes presence information, which may be provided by a user, a server, a device, or by machine learning. In various embodiments, environmental information may be monitored and managed based on information received by machine learning, and/or one from or more users 203A-203N and 205A-205N, or any of the other components of the systems described herein. For example, presence may be provided by any hardware/software that can be used to determine presence of a user, e.g., by detecting either physical presence and/or virtual presence (e.g., based on information detected by a video sensor, a login, touch screen activity, an established communication session, an accelerometer, and/or devices on which the user is remotely logged into, and/or the like). Presence information can include user data obtained from various sources (e.g., communications, social media posts, presence statuses, state information, entity information, etc.). In some aspects, the presence information can be used to determine a device to which to deliver a whisper, such as a device that a user is active on (e.g., as determined by the user's presence information and/or location information). The presence information can be used in combination with any other information, as disclosed herein, to manage whispers. For example, a user's current communications activity (e.g., a current communication session) may be used in combination with environmental information to manage a whisper. Thus, a whisper may be delivered to a particular device based on a presence of a user at the device in combination with environmental information obtained from surroundings of the device and/or user.

Environmental data 260 can include determinations of locations of devices, in addition to presence information and location information of users. The locations of devices can include relationships of devices (e.g., which devices are associated with which users) and also physical relationships of devices (e.g., whether a device is in the vicinity of other devices, connected to other devices, etc.). Device information can be taken into account when managing whispers because some devices may have capabilities that other devices do not have (e.g., specific input/output sensors).

The information about peoples' locations may be obtained in any manner, including through use of one or more sensors (not shown in FIG. 2) in combination with one or more devices. The sensors can be or may include any type of sensor, such as, an accelerometer, a video camera, a network sensor (e.g., an antenna), a Radio Frequency Identifier (RFID) sensor, an accelerometer, a temperature sensor, a pressure sensor, an ultrasonic sensor, a proximity sensor, a level sensor, an infrared sensor, an inclinometer, a microphone, and/or the like. In various embodiments, methods and systems disclosed herein include detecting a presence of human bodies. For example, a camera may be automatically turned on at a specified time and/or for a specified time period to capture an image and/or a full motion video of the environment, which is then analyzed (e.g., by detecting motion, shapes, patterns, using facial recognition technology, etc.) to determine how many people are present in the environment. A video sensor may be in a user communication device and/or external to the user communication device. Similarly, a sound detecting device may be automatically turned on at a specified time and/or for a specified time period to capture sound of the environment, which is then analyzed (e.g., by detecting voice recognition, acoustic patterns, speaker diarisation, etc.) to determine how many people are present in the environment. An audio sensor may be in a user communication device and/or external to the user communication device. The systems and methods disclosed herein may thereby advantageously detect people that are located in a specified vicinity.

Environmental information can include other information about the environment surrounding a user and/or device. For example, it can include location of a user and/or device and also locations of devices that are in proximity to a user and/or device. The location may be determined as described herein, and also by a network sensor, location sensor, or other type of sensor. For example, A network sensor may be used to detect access to different types of networks, such as, WiFi, cellular (e.g., 3G, 4G, 5G, etc.), Bluetooth, Ethernet, and/or the like. The network sensor may detect multiple networks at the same time. Location may be determined by the type and amounts of networks detected. In a similar manner, a GPS sensor can be or may include any sensor/software that can be used to gather location information for a user communication device, and a location may be determined based on information provided by the GPS sensor. The GPS sensor 113C may comprise multiple GPS sensors in multiple user communication devices. Also, a RFID sensor can be any sensor that can be used to detect an RFID tag and the RFID sensor can be in a user communication device and/or external to the user communication device. For example, a user communication device may contain an RFID sensor that can detect when a user enters a specific room or building.

Environmental information may include a type of environment of the surroundings. For example, the type of environment may be a home office determined by a proximity of specific devices, or it may be determined that a user is present at a home location based on GPS data. The type of environment may be determined to be private, public, and/or a work environment, for example, and may be determined by information provided by one or more sensors, and/or by other information, including that provided by a user. In some embodiments, additional information may be gathered about a user's and/or device's environment, e.g., by obtaining data from a sensor when the environment is determined to be a certain type of environment. For example, if a user is determined to be at a home location and using speakers on a device to conduct a communication session, information may be obtained from a camera and/or a microphone of the device to determine if there are other people present in the vicinity of the user before a whisper is provided to the user.

In various embodiments, additional information may be gathered about a user's and/or device's environment, e.g., using a sensor, based on a classification associated with the user, the communication session, the whisper, and/or the device. For example, a classification may include a privacy level. A privacy level may also be referred to herein as an importance level, an urgency level, and a security level, although in some embodiments, these may also be differentiated by the methods and systems herein. For example, a secret project name may have a high importance level, a high security level, and a high privacy level that determines properties and/or actions of any whisper associated with the secret project name. However, a user's birthdate may have a high privacy level and a high security level, but a low importance level. In addition, a specific key word within the whisper may have a high privacy level while the whisper itself has a medium security level and the other words in the whisper have a low importance level. Each of these levels may be individually, or in any combination, associated with various thresholds, properties, and/or rules. The classifications may be managed in any manner, such as by designating them as high, medium, and low, by designating them numerically using numbers 1-10, or by associating other types of information with them.

Properties of a whisper can be saved in whisper rules 250 and may be used to manage whispers using rules. The properties may be obtained and/or set in any manner. In various embodiments, properties of a whisper may be provided by a user, a server, a device, or by machine learning. For example, information related to a whisper may be managed based on information received by machine learning, and/or one from or more users 203A-203N and 205A-205N, or any of the other components of the systems described herein. The properties of a whisper can include, and are not limited to, information associated with any user and/or device associated with the whisper, information related to the content or classification of a whisper, and information about delivery of a whisper.

The whisper rules 250 may be used to manage whispers, as described herein. For example, the rules may manage whether a whisper will be configured as a visual whisper and/or an audio whisper, and whether the whisper has any timing, thresholds, other associated rules, and/or notifications configured with the whisper. This management of a whisper may be enacted based on any of the information in the environmental data 260 and/or in the whisper rules 250. Examples of information that may be managed in order to configure whispers include setting and managing key words related to a whisper, setting delivery options of a whisper, configuring notifications, etc.).

Various embodiments disclosed herein manage the delivery of a whisper. Any properties and information related to the delivery of a whisper may be managed by the systems and methods disclosed herein. For example, the whisper engine 232 (or another one or more components) may manage which device(s) are used for delivery of a whisper. The management of devices (e.g., changing a device or adding or removing one or more devices for delivery) may be based on differences in environmental data 260 and/or whisper rules 250, in combination with properties of a whisper. A modality of deliver may also be managed. For example, a verbal whisper may be changed to be a textual whisper, a real-time whisper may be sent to voicemail or otherwise stored for later retrieval (e.g., the whisper may be postponed), etc. Options for a sending user to receive a confirmation of the whisper delivery may be provided. In addition, options for a receiving user to manage the whisper may be provided. These options can include delaying delivery of the whisper, denying delivery of the whisper (e.g., canceling delivery of the whisper), sending the whisper to an alternate delivery device, saving or deleting the whisper, and/or replying to the whisper (e.g., replying automatically following an action, replying via text regardless of a modality of the whisper itself, etc.). Managing a whisper, and options for managing a whisper may be related to and/or in response to, a notification. For example, a user may be prompted to take an action related to a whisper after receiving a notification about the whisper.

In some aspects, timing, thresholds, and/or notifications related to a whisper may be managed. In some embodiments, the modality of a whisper may be changed and this may relate to notifications. For example, a whisper may be set to display as a scrolling text bar. A whisper may be postponed so that the whisper will not be delivered (e.g., will not play and/or display) at the communication device until a specified time, such as a break in a conversation or an end of a conversation. Expiration timings may be managed for whispers as well. For example, a whisper may be set to have a certain expiration time, or to expire after a certain amount of time. Upon expiration of the time (or reaching the expiration time), the whisper may be further managed (e.g., a delivery of the whisper may be changed, the whisper may be deleted, a sender may be notified of the expiration, etc.). Managing the whispers, whisper delivery, and other information in the systems and methods described herein may be done by one or more components of the whisper engine 232.

The whisper engine 232, or one or more components thereof, may be configured to fetch information continuously or in any configuration of intervals. In various embodiments, the whisper engine 232 may be configured to fetch information that is detected by the environmental analysis engine 248, such as by retrieving information from environmental data 260. The whisper engine 232 may fetch all types of environmental information, including any presence data and/or location data. The whisper engine 232 may manage information in environmental data 260, including detecting any changes or updates to the information and updating the information (e.g., the information stored in whisper rules 250 and/or environmental data 260) when it changes. The whisper engine 232 may fetch any types of other information, including any information from whisper rules 250. The whisper engine 232 may also manage information in whisper rules 250. The whisper engine 232 may store information (e.g., environmental data 260 and whisper rules 250) and also use the stored information to manage rules. The whisper engine 232 can run comparisons and manage communications to and from users 203A-203N and 205A-205N. The whisper engine 232 may manage other information as well, including notifications, thresholds, and timers, as discussed herein.

Whisper rules 250 include policies related to whispers, communications, and environmental information. The policies may also be referred to herein as rules and may include user settings and preferences. The rules may have any configuration and can have various types of information associated with them, including actions, thresholds, user preferences, and user settings, for example. The management and implementation of rules may be automatic, without user input. Rules may be configured to be personalized for one or more communication devices (e.g., 204A-204N and/or 202A-202N) and/or users (e.g., 203A-203N and 205A-205N).

The whisper rules 250, machine learning, one or more users 203A-203N and 205A-205N, and/or other components of whisper engine 232 may define and manage rules that determine the actions of the whisper engine 232 and/or the environmental analysis engine 248. The rules define when and how to send (or not send) a whisper, and also what other actions to perform, such as notifying users. The rules may incorporate one or more thresholds that interact with the rules or determine implementation of the rules. For example, rules may change based on one or more thresholds, and rules may be invoked based on one or more thresholds. Rules may define actions and thus, actions may correspond to the rules. The rules may determine timing for when to perform one or more actions and may determine one or more actions to perform.

Rules may be associated with any desired information, such as a user, a particular group of users, a particular piece or pieces of environmental information, a type of content (e.g., one or more key words, visual content, audible content, a privacy level of content, an importance of content, and/or a security type of content), thresholds, other rules, and any combination of these. For example, if a user desires for one of their devices to have a different set of rules than another one of their devices, they may define rules doing so and/or the machine learning may determine that such rules should be implemented.

Notifications can relate to settings associated with a whisper. Notifications may be associated with any information, including environmental information, whisper properties, and/or rules. Notifications are also referred to herein as warnings, indicators, updates, and status updates. Notifications may be set by a user, a server, a device, or by machine learning. For example, notifications may be monitored and managed based on information received by machine learning, and/or one from or more users 203A-203N and 205A-205N, or any of the other components of the systems described herein.

Examples of notifications include, and are not limited to, notifying a user of an incoming whisper, notifying a user when a delivery of a whisper is postponed or canceled, notifying a user to take an action associated with a whisper, and notifying a user of a change in delivery of a whisper. The notifications, similar to the rules, can be configured to be implemented automatically without human input, including automatically configuring and implementing notifications based on other information (e.g., when environmental information is determined, when a threshold is met, when conditions of a rule are met, etc.). The whisper engine 232 may manage notifications, including the starting and stopping of notifications.

Timing information includes any timing information associated with a whisper. Timing information can include, and is not limited to, the timing of a whisper, the delay of a whisper, timing to monitor environmental conditions (e.g., monitoring events related to a communication session, monitoring a timeframe or timing to collect sensor data, etc.), timing of notifications, timing of thresholds, timing of rules, and timing of responses from the system, a user, and/or a device. Timing information is also referred to as timers, time information, timing data, and time, herein. Timing information may be times that are set as settings or set by rules, and/or times that are monitored by the systems and methods as disclosed herein. Timing information may be set by a user, a server, a device, or by machine learning. For example, timing information may be monitored and managed based on information received by machine learning, and/or one from or more users 203A-203N and 205A-205N, or any of the other components of the systems described herein.

In some embodiments, the whisper engine 232 may obtain the timing information from various sources, including whisper rules 250, users 203A-203N and 205A-205N, communication server 228, and other sources. The whisper engine 232 may manage the timers, including the starting and stopping of timers. For example, in various embodiments, the whisper engine 232 may set a timer for detecting environmental information (e.g., an amount of time when, and during which, to turn on a microphone and/or camera on a device in order to detect any visual and/or audible information), the whisper engine 232 may set a timer related to a delivery option of a whisper (e.g., to set a playback for a particular time, and/or to allow a receiving user to callback the sender of the whisper), the whisper engine 232 may set a timer for a delay in playback of a whisper (including waiting until a user is available to receive the whisper or delaying the playback until a particular time and/or event, such as the end of a communication), the whisper engine 232 may set a whisper to expire when a timer expires, and the whisper engine 232 may manage other settings related to timers. A sending user and/or a receiving user may set and manage timing information.

In some embodiments, the timing of a whisper may be extended. For example, a user may not be available at a time when a whisper is sent to the user. Thus, the timing of the whisper may be extended until a later time. The later time may be an amount of time in the future, a particular time and/or date, or a time associated with an event (e.g., the end of the communication session, a time when the communication session is on hold, etc.). In addition, the timing of a whisper may be extended based on other information, such as a level of privacy associated with the whisper and/or environmental information. For example, in some embodiments, if a whisper is determined to contain private content (or to have a specified privacy level), then the delivery of the whisper may be delayed until certain conditions are met (e.g., a communication session is ended, a receiving user indicates that they are in a private environment, a receiving user enters a private location (based on sensor data)), etc.). Thus, a whisper may have a delivery option that the timing of the delivery (e.g., playback and/or display) is delayed until a user is available, and/or until environmental conditions surrounding a user meet what is required by a rule governing the whisper.

As one example, an amount of time may be set (e.g., as a timer) based on a rule in whisper rules 250 when configuring a whisper. The whisper engine 232 may adjust the timer if any new information (e.g., new environmental information related to the rule) is received, such as by stopping the timer, adding time or reducing time on the timer, or resetting the timer to a value that corresponds to the updated information. Timers may be applied to, and managed for, more than one rule at a time.

In various embodiments, rules may be based on properties of the whisper, such as a privacy, and/or other information related to the whisper. These properties of the whisper may be determined based on information within the whisper content and/or information associated with the whisper. For example, an importance, privacy, and/or security of the whisper may be based on one or more key words within the whisper content, a sender of the content, the identity or location of a participant of the communication session, etc. The rules may be predetermined (e.g., automatically applied by the whisper engine 232 and/or set or managed based on various criteria). The rules are configurable at any timing (e.g., an update to the rules will occur at a future date) or in real-time. For example, managing communication information, environmental information, and actions, may occur at any timing or continuously in real-time.

Thresholds may be used in the configuration of rules. Some settings configured by a user can cause rules to be implemented (and, if applicable, notifications to be displayed) at one or more communication devices (e.g., 204A-204N and/or 202A-202N) when a threshold is met or exceeded. Notifications may be associated with thresholds. Various thresholds may be set for any user (e.g., 203A-203N and 205A-205N), any communication device (e.g., 204A-204N and/or 202A-202N), and/or any rule or other information. In addition, whisper engine 232 may automatically configure one or more thresholds and associated rules. Regardless of how rules and thresholds were initially configured, they may change based on machine learning or from input by a user changing them.

In some embodiments, thresholds may correspond to a specified piece of environmental information that exceeds a certain threshold (e.g., it is detected that a user is not alone in a room by detecting a threshold number of voice patterns, or that a user is at a public location by detecting a type of noise together with a threshold volume for the type of noise). Thresholds may correspond to presence information of a user, including which device is being used for a communication session and which other devices the user is engaged with. A threshold may be related to a status of a user (e.g., a presence of the user on a device is detected within a specified timeframe, where the amount of the timeframe is a threshold) or environmental information (e.g., a user's device is connected to a specified number of devices associated with a user's home office, where the specified number of devices is the threshold).

Examples of rules that may interact with thresholds include that if a user is in a conference room setting, then the whisper may not play unless the user is engaged in the communication session via headphone audio. However, if the user is at a home location and the user is using speakers connected to a device as the audio for a communication session, then if it is determined that the user is not alone, the whisper may not play on the speakers and if it is determined that the user is alone, then the whisper may play on the speakers. Thresholds may be set to determine the environmental information, and to determine which environmental information meets criteria (e.g., meets a threshold) to use in a comparison. If a whisper does not play, then other actions may be taken based on the rules; for example, the user may receive a notification of the whisper, the whisper may be transcribed so that it displays as a visual whisper instead of as an audio whisper, the whisper may be sent to a different device (e.g., sent to voicemail and/or saved as an audio file), and/or the whisper may be paused or otherwise saved for later retrieval or playback.

Rules can be customized based on any criteria, e.g., one or more rules may be specific to any user, device, or groups of users or devices. For example, users 203A-203N and 205A-205N may each have profile settings that configure one or more of their rules, thresholds, preferred configurations of notifications, etc., among other user preferences. Settings chosen by an administrator or a certain user may override other settings that have been set by other users 203A-203N and 205A-205N, or settings that are set by default. Alternatively, settings chosen by a user may be altered or ignored based on any criteria at any point in the process. For example, settings may be created or altered based on a user's association with a membership or a group (e.g., if a user is in a training group, then the training group may have specific rules related to whispers sent to users in the training group and/or sent by users in the training group), based on a location or timing, or based on a user's identity or association with an entity, among others.

Rules may be configured based on groups. For example, a privacy level or delivery options for the whisper may be associated with a certain group. Groups may be pre-defined by one or more users. In various embodiments, groups may have a type and the type may be a property of the group. Types of groups can include a level of importance, supervisors, training (e.g., users being trained and/or users training others), organizations, job titles, and office locations, among others. Each type of group may have properties that are customized for the specific type of group. Groups may have properties that define rules. In some embodiments, one or more types of groups can inherently have properties where whispers will be played or not played in spite of other rules (e.g., if a level of importance of the group is a certain level). In various embodiments, a user may be given an option in the notification or following the notification to delay the whisper or send the whisper to another device or by a different modality. Groups may be related to content (e.g., key words, classifications, etc.) of whispers. Each type of content may have properties that are customizable.

Figure 3:
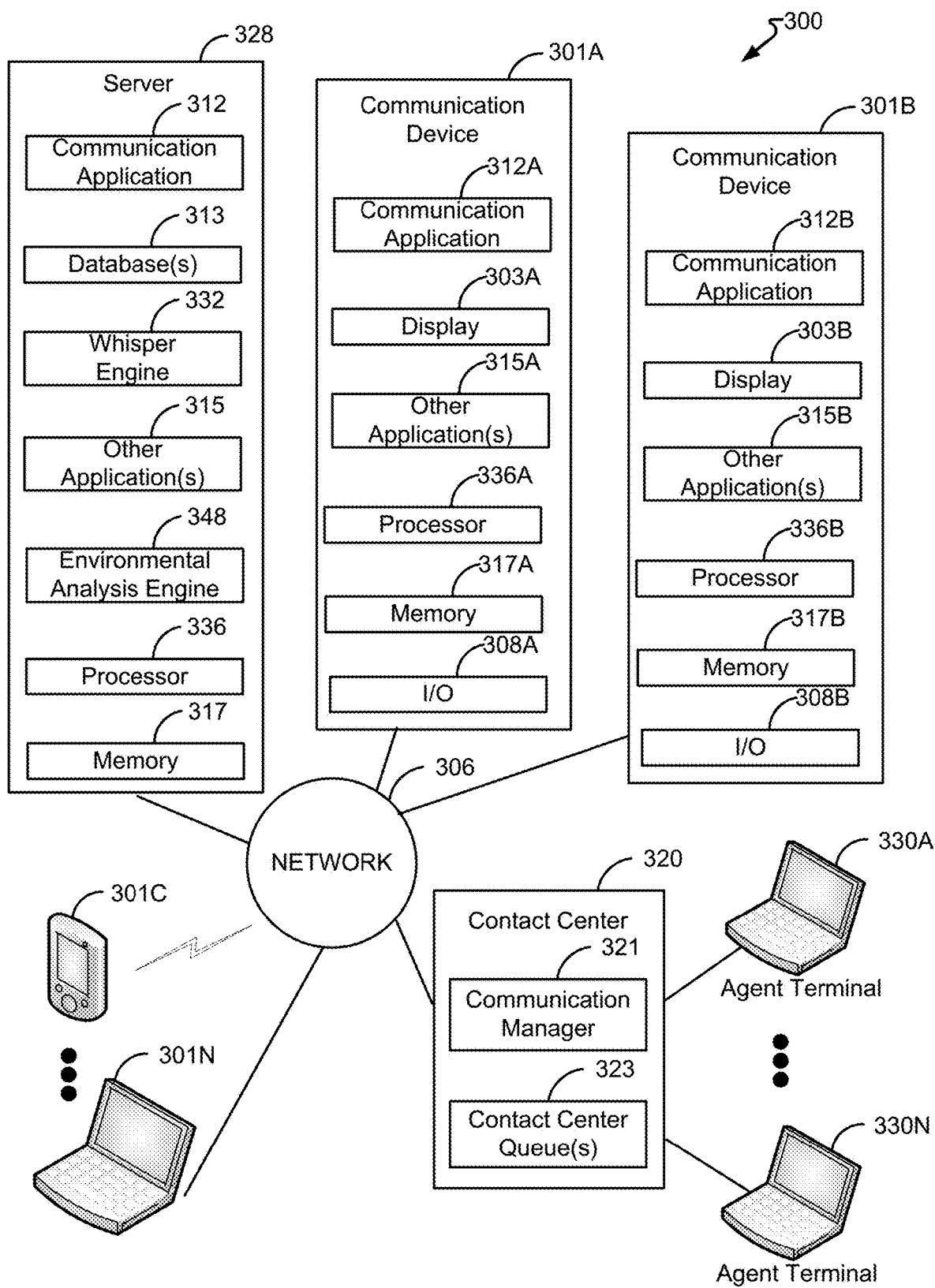
FIG. 3 is a block diagram of a third illustrative system for implementing a communication session in accordance with some embodiments of the present disclosure.

Referring to FIG. 3, a block diagram showing a third illustrative system 300 in accordance with some embodiments described herein is shown. In some aspects, the components shown in FIG. 3 may correspond to like components shown in FIGS. 1 and 2. The first illustrative system 300 comprises communication devices 301A-301N, a network 306, a contact center 320, and agent terminals 330A-330N.

The user communication devices 301A-301N may correspond to a computing device, a personal communication device, a portable communication device, a laptop, a smartphone, a personal computer, and/or any other device capable of running an operating system, a web browser, or the like. For instance, communication devices 301A-301N may be configured to operate various versions of Microsoft Corp.'s Windows® and/or Apple Corp.'s Macintosh® operating systems, any of a variety of commercially-available UNIX® such as LINUX or other UNIX-like operating systems, iOS, Android®, etc. These communication devices 301A-301N may also have any of a variety of applications, including for example, a database client and/or server applications, web browser applications, chat applications, social media applications, calling applications, etc. A communication device 301A-301N may alternatively or additionally be any other electronic device, such as a thin-client computer, Internet-enabled mobile telephone, and/or personal digital assistant, capable of communicating via communication network 306 and/or displaying and navigating web pages or other types of electronic documents can be or may include any communication device that can communicate on the network 306, such as a Personal Computer ("PC"), a video phone, a video conferencing system, a cellular telephone, a Personal Digital Assistant ("PDA"), a tablet device, a notebook device, a smartphone, and/or the like. The user communication devices 301A-301N are devices where a communication session ends. Any number of user communication devices 301A-301N may be connected to the network 306 for establishing a communication session. One or more of the communication devices 301A-301N may include more or less components than those shown in FIG. 3.

The user communication devices 301A-301N may each further comprise communication applications 312A, 312B, displays 303A, 303B, other application(s) 315A, 315B, processor 336A, 336B, memory 317A, 317B, and input/output 308A, 308B.

The communication applications 312A, 312B can be or may include any hardware/software that can manage a communication session including whispers. For example, the communication applications 312A, 312B can be used to establish and display a communication session. In various embodiments, one or more of the communication applications can be a contact center application that can be loaded on the communication device 301A, 301B that can provide services for the contact center 320. For example, a contact center application may provide a user interface that allows a user to initiate a voice call, initiate a video call, send an email, send a text message, initiate a virtual reality session, initiate an IM session, and/or the like to the contact center. A contact center application may be used for digital self-service in addition to assisted service via a contact center.

The other application(s) 315A, 315B can be any application, such as, a communication application other than communication application 312A, 312B, a slide presentation application, a document editor application, a document display application, a graphical editing application, a calculator, an email application, a spreadsheet, a multimedia application, a gaming application, and/or the like. The other application(s) 315A, 315B may work with the communication applications 312A, 312B and may work to enable and manage whispers.

The displays 303A, 303B can be or may include any hardware display/projection system that can display an image of a video conference, such as a LED display, a plasma display, a projector, a liquid crystal display, a cathode ray tube, and/or the like. The displays 303A-303B can be used to display user interfaces as part of communication applications 312A-312B.

The processor 336A, 336B may comprise a processor or microprocessor. Memory 317A, 317B may comprise memory, data storage, or other non-transitory storage device configured with instructions for the operation of the processor 336A, 336B to perform steps described herein. may include one or multiple computer memory devices. The memory 317A, 317B may be configured to store program instructions that are executable by one or more processors (not shown) and that ultimately provide functionality of the systems described herein. The memory may also be configured to store data or information that is usable or capable of being called by the instructions stored in memory. The memory may include, for example, Random Access Memory (RAM) devices, Read Only Memory (ROM) devices, flash memory devices, magnetic disk storage media, optical storage media, solid-state storage devices, core memory, buffer memory devices, combinations thereof, and the like. The memory, in some embodiments, corresponds to a computer-readable storage media and the memory may correspond to a memory device, database, or appliance that is internal or external to the contact center 320. Accordingly, processes may be embodied as machine-readable and machine-executable code for execution by a processor to perform the steps herein and, optionally, other processing tasks.

Input/output devices 308A, 308B may comprise, but should not be considered as limited to, keyboards, mice, microphones, cameras, display devices, network cards, etc. The input/output 308A, 308B may comprise, for example, any device such as a transducer to convert sound from a user or from an environment around a user (e.g., around one or more communication devices 301A, 301B) into an electrical signal. In some embodiments, the sound may be detected at the communication device at a microphone, which may comprise a dynamic microphone, a condenser microphone, a contact microphone, an array of microphones, or any type of device capable of converting sounds to a signal.

Illustratively, the user communication devices 301A, 301B, the communication applications 312A, 312B, the displays 303A, 303B, and the other application(s) 315A, 315B, may be stored program-controlled entities, such as a computer or microprocessor, which performs the methods and the processes described herein by executing program instructions stored in a computer readable storage medium, such as a memory (i.e., a computer memory, a hard disk, and/or the like). Although the methods described herein may be shown in a specific order, one of skill in the art would recognize that the steps may be implemented in different orders and/or be implemented in a multi-threaded environment. Moreover, various steps may be omitted or added based on implementation.

The network 306 can be any type of network familiar to those skilled in the art that can support data communications using any of a variety of commercially-available protocols, including without limitation SIP, TCP/IP, SNA, IPX, Apple-Talk, and the like. The network 306 may be used by the communication devices 301A, 301B, a contact center 320, and a server 328, to carry out communications. As shown in FIG. 3, applications and engines for the methods and systems disclosed herein may be hosted on server 328, in addition to or instead of being elements of a contact center and/or communication devices. During a communication session, data, such as a digital or analog audio signal or data comprising audio and video data, may be sent and/or received via communication device 301A, and data 336B may be sent and/or received via server 328. In some embodiments, a communication session may comprise two or more users of communication devices 301A, 301B and/or one or more agent terminals 330A-330N, to communicate over the Internet using a communication application such as a video conferencing application. While many of the examples discussed herein deal with video communication, it should be appreciated that these same methods and systems of managing the audio of a communication session apply in similar ways to audio-only communications. For example, the systems and methods described herein may be applied to telephone conversations as well as voice-over-IP communications, video chat applications such as FaceTime or Zoom, or other systems in which two or more users communicate using sound.

The server 328 may comprise any type of computer device that can communicate on the network 306, such as a server, a Personal Computer ("PC"), a video phone, a video conferencing system, a cellular telephone, a Personal Digital Assistant ("PDA"), a tablet device, a notebook device, a smartphone, and/or the like. Although only one server 328 is shown for convenience in FIG. 3, any number of servers 328 may be connected to the network 306 for managing a communication session and whisper functions.

The server 328 may further comprise a communication application 312, database(s) 313, whisper engine 332, other application(s) 315, an environmental analysis engine 348, processor 336, and memory 317, and, while not shown for convenience, other elements such as a microprocessor, a microphone, a browser application, and/or the like. In various embodiments, one or more components of the server 328 (such as the communication application, the other applications(s), and the memory) may correspond to like components of the communication devices 301A, 301B. The server may include more or less components than those shown in FIG. 3.

The whisper engine 332 can manage whispers in system 300. For example, whisper engine uses rules from database(s) 313 in combination with environmental analysis engine 348 to manage whispers in system 300. The environmental analysis engine 348 may be responsible for detecting and analyzing environmental information, including environmental information obtained from communication devices 301A-301N. For example, upon receiving an audio signal from a communication device 301A, 301B that is participating in a communication session, the environmental analysis engine 348 may process the audio signal using memory 317 and processor 336 to determine environmental information (including levels and types of noises) and other properties of the environmental information at the communication device 301A, 301B. Environmental noise can be any noise occurring at a communication device. Further, the environmental analysis engine 348 may filter or otherwise separate audio including a user's voice from other noise. The environmental analysis engine 348 may execute one or more artificial intelligence algorithms or subsystems capable of identifying a human voice or otherwise distinguishing between one or more voices and other noises. The environmental analysis engine 348 may process the audio signal(s) to determine environmental information, including whether a user is alone or other people are present. Similarly, the environmental analysis engine 348 may filter or otherwise separate video and/or images including a human face and/or body from other human faces and/or bodies. The environmental analysis engine 348 may execute one or more artificial intelligence algorithms or subsystems capable of identifying a person or otherwise distinguishing between one or more people. The environmental analysis engine 348 may process the video and/or image signal(s) to determine environmental information, including whether a user is alone or other people are present.

As discussed herein, information received by input/output devices 308A, 308B may be managed by various settings. For example, each communication device 301A, 301B may determine when and how input is received and sent to environmental analysis engine 348. Such determinations may use timer information for receiving input (e.g., a duration of the inputs). In some embodiments, the input at communication devices may be set and managed by other components in system 300. As one illustrative example, each communication device 301A, 301B may have a camera and a microphone. However, a user of communication device 301A has configured the settings so that the microphone of device 301A may only receive audio for one minute to send to environmental analysis engine 348 at the request of whisper engine 332, and has denied environmental analysis engine 348 any access to camera data of device 301A. A user of device 301B has configured the settings so that the microphone and the camera of device 301B may receive audio and video/image data for up to ten minutes to send to environmental analysis engine 348 at the request of whisper engine 332.

As described herein, the environmental analysis engine 348 may receive sensor data (e.g., from input/output devices) from a communication device 301A, 301B, participating in a communication session. The environmental analysis engine 348 may process the sensor data using memory 317 and processor 336 to determine environmental information including properties of the environment in which the user is surrounded by (e.g., if the user is alone in a room). For example, if a camera is used, environmental information can be any visual information occurring at communication device 301A, 301B, such as people that are present and/or moving in a video image. The environmental analysis engine 348 may execute one or more artificial intelligence algorithms or subsystems capable of identifying a human body (including a human face) or otherwise distinguishing between one or more human bodies and other objects. The environmental analysis engine 348 may process the video signal(s) to determine if a user is alone or if other people are present. In some embodiments, the video signal may be limited to a single image. As discussed herein, the video signal may be received for only a specific time duration for use by the environmental analysis engine.

The contact center 320 can be or may include any hardware coupled with software that can route and manage communications in the contact center 320, such as a Private Branch Exchange (PBX), a communication manager 321, a session manager, a call center, and/or the like. The contact center 320 further comprises contact center queue(s) 323.

The communication manager 321 can be or may include any hardware coupled with software that can route and manage communications in the contact center 320, such as a PBX, a session manager, a switch, a router, and/or the like. The communication manager 321 can manage various types of communications in the contact center 320, such as voice communications, video communications, emails, Instant Messaging (IM) communications, text messaging, virtual reality communications, and/or the like.

The contact center queue(s) 323 are designed to hold incoming calls while the caller is waiting to be connected to a contact center agent (e.g., a contact center agent at agent terminal 330A). The contact center queue(s) 323 may support one or more types of communications, such as, voice calls, video calls, emails, Instant Message sessions, text messages, virtual reality communications, and/or the like.

The contact center 320 can be or may include any hardware coupled with software that can manage communications (incoming and/or outgoing) that are routed to and/or from agents. For example, the contact center 320 can include a network border device (not shown) and a number of servers (not shown) that enable functionality of the contact center 320. In some embodiments, each server of the contact center 320 may be configured to perform a particular task or a set of tasks specific to supporting functions of the contact center 320. The contact center 320 may comprise multiple distributed contact centers 320.

The agent terminals 330A-330N can be or may include any communication device that is used by a contact center agent, such as a communication device. The agent terminals 330A-330N may comprise multiple agent terminals 330A-330N for each contact center agent. For example, a contact center agent may have a telephone and a personal computer. The agent terminals 330A-330N may be associated with agents (not shown) that service communications in the contact center 320. The agents can include supervisors and other types of agents. Some agents may supervise other agents and train other agents. Some agents may send whispers to other agents. Agents may engage in communication sessions with other agents and/or users either within the contact center 320, or external to the contact center 320. For example, agents may use agent terminals 330A-330N and/or communication devices 301A-301N to engage in communication sessions with users at devices 301A-301N. Aspects of the communication sessions may be managed by communication applications 312A, 312B, other applications 315A, 315B, and/or server 328 or components thereof, such as whisper engine 332, environmental analysis engine 348, communication application 312, and/or other applications 315.

Thus, in various embodiments, the contact center 320 may include one or more computing devices (e.g., terminals 330A-330N) that enable a contact center agent (not shown) to interact with a customer (also referred to herein as a user and a callee) via one or more communication channels established between the communication device 301A-301N and the contact center 320.

While certain components are depicted as being included in the server 328, devices 301A, 301B, and contact center 120, it should be appreciated that one or more components may be provided in any other server or set of servers internal or external to the contact center 120. For instance, components of the whisper engine 332 may be provided in communication manager 321 and/or one or more communication servers (not shown), or vice versa. Further still, embodiments of the present disclosure contemplate a single server that is provided with all capabilities of the whisper engine 332 and any communication server(s). The communication manager 321 may intelligently route communications to particular agents (or groups of agents) even when the agents and/or communication sessions use devices and/or elements that are outside of the contact center 320. The communication manager 321 may provide appropriate signaling to an agent terminal 330A-330N and/or devices 301A-301N that enables the agent terminal 330A-330N and/or the devices 301A-301N to connect with the communication channel over which a user is communicating. In various embodiments, agents of the communication center may use communication devices 301A-301N. Thus, whispers may be sent between agent terminals 330A-330N, as well as between agent terminals 330A-330N and communication devices 301A-301N, as well as between communication devices 301A-301N.

In some embodiments, a server may be responsible for establishing and maintaining a communication channel that is presented to the user's device 301A-301N and which enables the user to send communications to or through the contact center 120, and vice versa. Non-limiting examples of protocols that may be supported by the communication server 128 include Internet Message Access Protocol (IMAP), Post Office Protocol (POP), Simple Mail Transfer Protocol (SMTP), and Exchange. Elements of system 300 may alternatively or additionally be configured to support real-time or near-real-time text-based communication protocols, video-based communication protocols, and/or voice-based communication protocols.

The communication manager 321 may be configured to support any number of communication protocols or applications whether synchronous or asynchronous. Non-limiting examples of communication protocols or applications that may be supported include webcast applications, the Session Initiation Protocol (SIP), File Transfer Protocol (FTP), Hypertext Transfer Protocol (HTTP), HTTP secure (HTTPS), Transmission Control Protocol (TCP), Java, Hypertext Markup Language (HTML), Short Message Service (SMS), Internet Relay Chat (IRC), Web Application Messaging (WAMP), SOAP, MIME, Real-Time Messaging Protocol (RTP), Web Real-Time Communications (WebRTC), WebGL, XMPP, Skype protocol, AIM, Microsoft Notification Protocol, email, etc.

As one illustrative example, an agent of the contact center 320 is using communication device 301A to establish a communication session with a user at communication device 301C, and another agent of the contact center 320 is using communication device 301B to establish a communication session with another user at communication device 301N. A supervisor at contact center 320 configures a whisper to send to each communication device 301A and 301B, and rules in database 313 determine that, when a whisper is sent to agents at communication devices 301A, 301B, environmental information must be obtained due to a privacy requirement associated with devices 301A and 301B. Thus, based on the rule, environmental information from device 301A is obtained via input/output 308A and analysis of the environmental information determines that the agent using device 301A is currently in a conference room with other people while being engaged in the communication session. Also, environmental information from device 301B is obtained via input/output 308B and analysis of the environmental information determines that the agent using device 301B is currently in a home office environment and is alone. Due to the privacy requirement and based on the environmental information, the whisper is sent to device 301B because that agent is alone in a home office. However, due to the privacy requirement and based on the environmental information, the whisper is not sent to device 301A because that agent is not alone. These actions may be configured and executed based on rules stored and managed by whisper engine 332. Instead, based on the rules, a notification is sent to device 301A with an option for the user to delay delivery of the whisper until a later time when the agent may choose to have the whisper delivered to device 301A.

Figure 4:
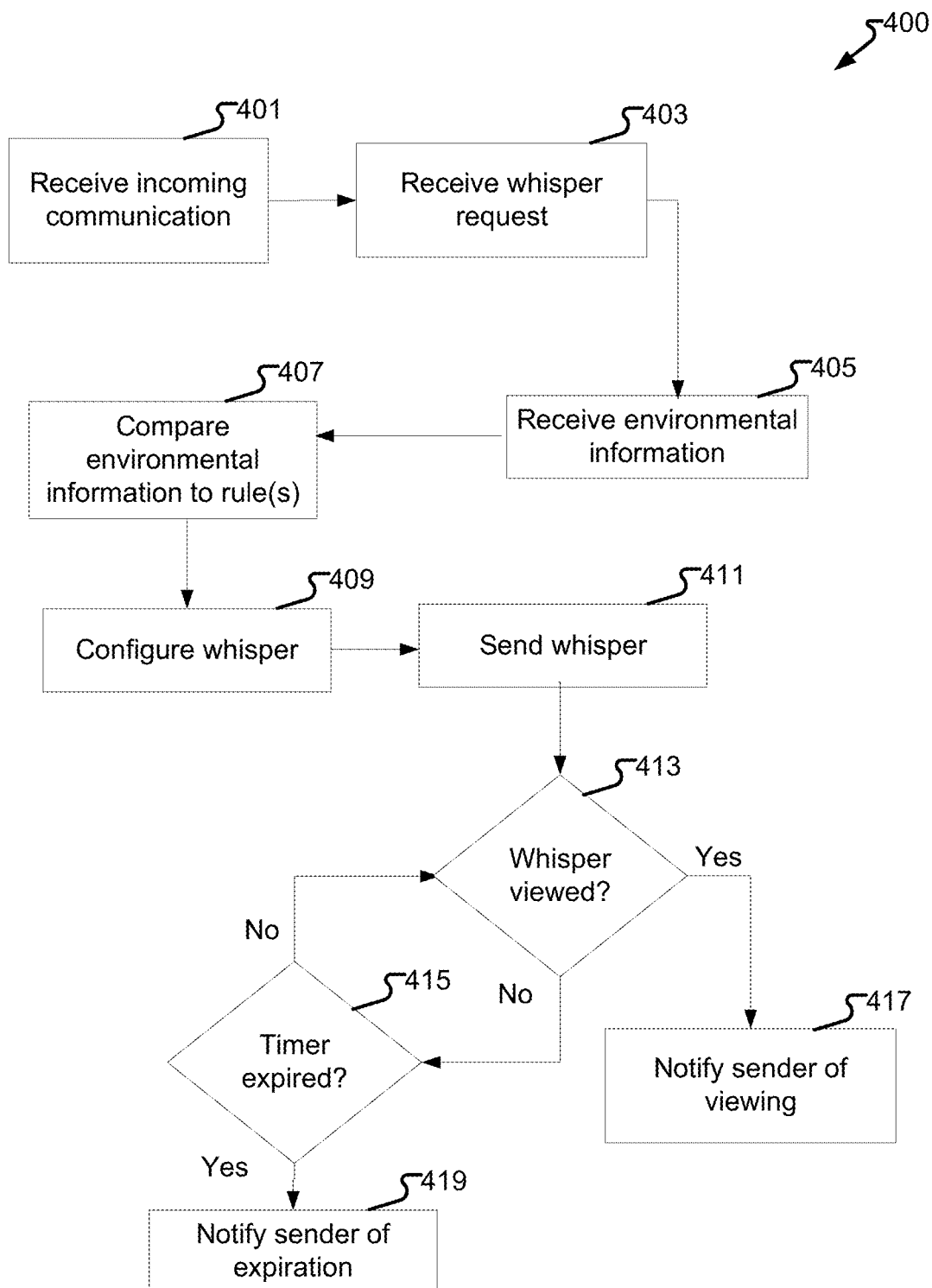
FIG. 4 is a flow diagram depicting a first method in accordance with at least some embodiments of the present disclosure.

Referring now to FIG. 4, a first communication method is described in accordance with at least some embodiments of the present disclosure. An illustrative example is described in conjunction with various steps of FIG. 4. The method begins when an incoming communication is received at step 401.

A whisper request is received at step 403. The whisper request is a request to send a whisper to a receiving user who is engaged in a communication session. The whisper request can provide properties of the whisper and rules to associate with the whisper, or the properties and rules associated with the whisper may be determined by the system. For example, the whisper engine may associate rules with the whisper based on a sender of the whisper and a destination of the whisper. In addition, the whisper engine may associate rules with the whisper based on key words within the whisper. One of the rules associated with the whisper is that if the user receiving the whisper is not alone, then the whisper is not played and a callback option is provided instead. Another rule associated with the whisper is that if the receiving user is on a speakerphone or an open speaker, then the whisper is not played and a message is provided to the receiving user that there is a pending whisper and to put on the headset to hear the whisper. Another rule associated with the whisper is to provide the receiving user with a transcription of the whisper.

At step 405, environmental information is received. In some embodiments, receiving user previously set up permissions for their input/output devices. The receiving user granted permissions to the system to record video and audio for one minute from the device on which the receiving user is receiving the whisper. Based on the rules and the receiving user's permissions, the system receives video and audio for one minute and analyzes the received video and audio to detect if another human body is present and/or another human voice (other than the receiving user's) is present in order to determine if the receiving user is alone in the room. Based on the analysis, it is determined that the receiving user has other people in the room with the receiving user and that the receiving user is using a speakerphone for the communication session.

The environmental information is compared to one or more rules at step 407. In particular, the facts that the user is not alone in the room and that the user is using a speakerphone are compared to the rules. At step 409, the whisper is configured in accordance with the rules. Thus, the callback option, message to display, and the transcription are configured.

At step 411, the whisper is sent. In particular, because the receiving user is not alone, the whisper is not played and the system instead displays a callback option that is a visual indicator telling the receiving user that they may select to receive a callback to obtain the whisper. Also, because the receiving user is using a speakerphone, the receiving user does not receive the whisper and the system instead displays a message stating "You have a pending whisper. To listen to the whisper, please put on your headphones and click the button below."

At step 413, it is determined whether the whisper is viewed. In this example, the receiving user decides to listen to the whisper by wearing the headphones and clicking the button to listen to the whisper. The transcription of the whisper is also sent to the receiving user's email. In various embodiments, because the whisper was viewed, the sender of the whisper is notified that the whisper was viewed at step 417.

In alternative embodiments, if the whisper is not viewed, then it is determined whether a timer is expired at step 415. The timer is associated with an expiration of the whisper because the whisper is time sensitive. If the time is not expired, the method returns to step 413 to determine if the whisper is viewed, and if the whisper is not viewed, then the method continues to determine if the timer is expired at step 415. When it is determined that the timer is expired, then the sender of the whisper is notified of the expiration at step 419. When the time is expired and the whisper hasn't been viewed, then the whisper may be handled in accordance with the rules. For example, the whisper and transcription may be not sent and deleted.

Figure 5:
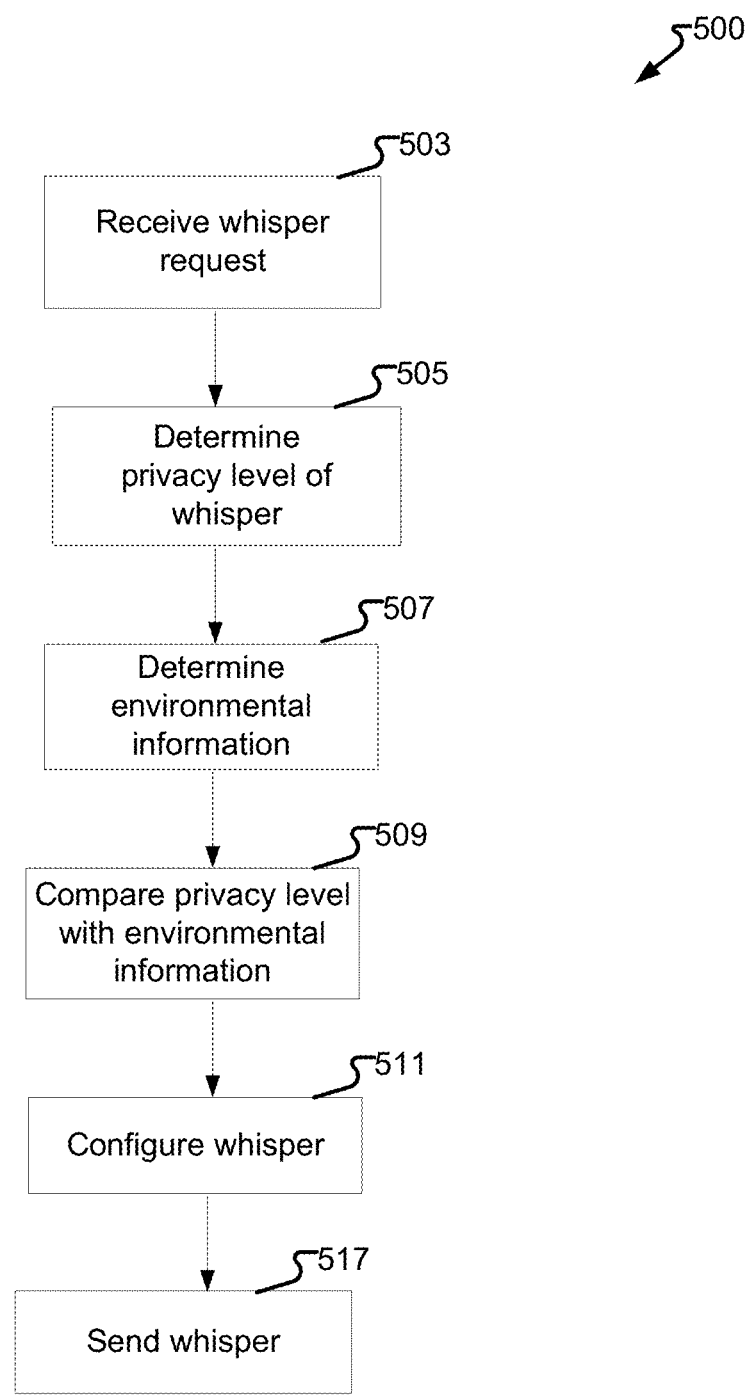
FIG. 5 is a flow diagram depicting a second method in accordance with at least some embodiments of the present disclosure.

Referring now to FIG. 5, a second communication method is described in accordance with at least some embodiments of the present disclosure. The method begins when a whisper request is received at step 503 for a sending user to send a whisper to a receiving user while the receiving user is engaged in a communication session on their mobile device.

At step 505, a privacy level of the whisper is determined and it is determined that the whisper contains key words requiring a high privacy level. For a high privacy level, rules are retrieved that state that the whisper may not be played at any receiving device unless the receiving user at the receiving device is alone and in a private location.

Based on the rules, a whisper engine determines that environmental information is required. Environmental information is determined at step 507. As discussed herein, environmental information may be determined based on delivery information for the whisper request (e.g., when the whisper request is received, then the method automatically determines environmental information for an environment related to a device that will be receiving the whisper), or environmental information may be determined based on something else (e.g., a preconfigured rule that is configured prior to any whisper being requested, configured, and/or implemented). Thus, in some embodiments, environmental information may be determined based on a privacy level of the whisper, and at step 507, it is determined whether the user is at a private location and whether the user is alone, based on the rules associated with the high privacy level.

The system analyzes microphone and location data from the user and determines that the user is at a public location and that the user is not alone.

At step 509, the privacy level is compared with the environmental information. In various embodiments, it is the rules associated with the privacy level that are used to configure and execute comparison of the privacy level with the environmental information. In this example, the system determines that the user is not alone and is at a public location, so based on the rules associated with the high privacy level, the whisper may not be played. However, the rules define that the whisper may be sent to the user as an email for the user to access the whisper at later time.

The whisper is configured at step 511. For example, the whisper is configured based on the comparison of the privacy level with the environmental information from step 509. In particular, a transcription of the whisper is created and formatted into an email to send to the receiving user. At step 517, the whisper is sent.

As can be appreciated by one skilled in the art, functions offered by the methods and systems depicted herein may be implemented in one or more network devices (i.e., servers, networked user device, non-networked user device, etc.).

The present disclosure, in various aspects, embodiments, and/or configurations, includes components, methods, processes, systems, and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of managing a whisper, the method comprising:
   establishing a communication session;
   receiving a whisper request from a second device to provide the whisper to a first device associated with the communication session;
   retrieving environmental information;
   comparing the environmental information to a rule;
   configuring the whisper based on the comparison;
   providing the whisper based on the comparison;
   changing a modality of the whisper in real time based on comparing the environmental information to the rule,
   wherein the modality of the whisper includes a verbal whisper or a textual whisper and
   wherein a user of the first device consents to a request sent at a same time as the whisper request to obtain the environmental information from a sensor associated with the first device; and
   detecting a privacy level of the user in the environmental information,
   wherein the configuring the whisper is based on the privacy level detected from the environmental information and a level of importance associated with the whisper.

2. The method of claim 1, wherein the rule is a privacy requirement for an environmental surrounding at the first device at a time of delivery of the whisper.

3. The method of claim 2, wherein the first device is participating in the communication session.

4. The method of claim 3, wherein the privacy requirement defines a privacy level of the environmental surrounding, wherein the retrieving the environmental information determines a privacy level of the environmental surrounding, and wherein the comparing comprises comparing the privacy requirement with the privacy level.

5. The method of claim 1, wherein the modality of the whisper changes based further on the level of importance.

6. The method of claim 1, wherein the first device is associated with the user, wherein the configuring the whisper comprises determining that the whisper should be provided to a third device that is also associated with the user, and wherein the providing the whisper comprises providing the whisper to the third device.

7. The method of claim 1, further comprising comparing the environmental information to a threshold, wherein the rule comprises the threshold, and wherein the threshold is based on a profile setting of the user.

8. The method of claim 1, wherein the environmental information from the sensor includes levels of noise recorded.

9. The method of claim 1, wherein the environmental information from the sensor includes a threshold number of voice patterns besides a voice pattern of the user.

10. A system for managing a whisper, the system comprising:
    a processor; and
    a computer-readable storage medium storing computer-readable instructions which, when executed by the processor, cause the processor to:
    establish a communication session;

receive a whisper request from a second device to provide the whisper to a first device associated with the communication session;
retrieve environmental information;
compare the environmental information to a rule;
configure the whisper based on the comparison;
provide the whisper based on the comparison;
change a modality of the whisper in real time based on comparing the environmental information to the rule,
wherein the modality of the whisper includes a verbal whisper or a textual whisper and
wherein a user of the first device consents to a request sent at a same time as the whisper request to obtain the environmental information from a sensor associated with the first device; and
detect a privacy level of the user in the environmental information,
wherein the configuring the whisper is based on the privacy level detected from the environmental information and a level of importance associated with the whisper.

11. The system of claim 10, wherein the rule is a privacy requirement for an environmental surrounding at the first device at a time of delivery of the whisper.

12. The system of claim 11, wherein the first device is participating in the communication session, wherein the privacy requirement defines a privacy level of the environmental surrounding, wherein the retrieving the environmental information determines a privacy level of the environmental surrounding, and wherein the comparing comprises comparing the privacy requirement with the privacy level.

13. The system of claim 10, wherein a device that the whisper is provided to changes based on the comparing.

14. The system of claim 10, wherein the sensor uses at least two of: an audio analysis, an image analysis, and a determination of locations of at least two devices.

15. The system of claim 10, wherein the modality of the whisper changes based further on the level of importance.

16. The system of claim 10, wherein the first device is associated with the user, wherein the configuring the whisper comprises determining that the whisper should be provided to a third device that is also associated with the user, and wherein the providing the whisper comprises providing the whisper to the third device.

17. The system of claim 10, further comprising comparing the environmental information to a threshold, wherein the rule comprises the threshold.

18. The system of claim 10, wherein the environmental information from the sensor includes levels of noise recorded.

19. The system of claim 10, wherein the environmental information from the sensor includes a threshold number of voice patterns besides a voice pattern of the user.

20. A computer program product for managing a whisper, the computer program product comprising a non-transitory computer-readable storage medium having computer-readable program code embodied therewith, the computer-readable program code configured, when executed by a processor, to:
establish a communication session;
receive a whisper request from a second device to provide the whisper to a device associated with the communication session;
retrieve environmental information;
compare the environmental information to a rule;
configure the whisper based on the comparison;
provide the whisper based on the comparison;
change a modality of the whisper in real time based on comparing the environmental information to the rule,
wherein the modality of the whisper includes a verbal whisper or a textual whisper and
wherein a user of the first device consents to a request sent at a same time as the whisper request to obtain the environmental information from a sensor associated with the first device; and
detect a privacy level of the user in the environmental information,
wherein the configuring the whisper is based on the privacy level detected from the environmental information and a level of importance associated with the whisper.

* * * * *